(12) United States Patent
Yeung et al.

(10) Patent No.: US 6,438,613 B1
(45) Date of Patent: *Aug. 20, 2002

(54) METHOD AND APPARATUS FOR ALLOWING PACKET DATA TO BE SEPARATED OVER MULTIPLE BUS TARGETS

(75) Inventors: Louise Y. Yeung, Redwood City; Rasoul M. Oskouy, Fremont, both of CA (US)

(73) Assignee: Sun Microsystems, Inc., Mountain View, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/012,025

(22) Filed: Jan. 22, 1998

Related U.S. Application Data

(62) Division of application No. 08/499,199, filed on Jul. 7, 1995, now Pat. No. 5,793,953.

(51) Int. Cl.[7] .............................................. G06F 13/00
(52) U.S. Cl. ....................... 709/250; 709/236; 709/246; 709/230
(58) Field of Search ................................ 709/250, 236, 709/230, 246

(56) References Cited

U.S. PATENT DOCUMENTS

| | | | | |
|---|---|---|---|---|
| 4,453,229 A | | 6/1984 | Schaire ........................ 710/109 |
| 5,611,057 A | | 6/1984 | Pecone et al. ............... 710/301 |
| 5,058,109 A | * | 10/1991 | Goldberg et al. ............ 370/401 |
| 5,136,582 A | * | 8/1992 | Firoozmand ................. 370/400 |
| 5,335,329 A | | 8/1994 | Cox et al. .................... 710/301 |
| 5,459,720 A | | 10/1995 | Iliev et al. ................... 370/393 |
| 5,497,460 A | | 3/1996 | Bailey et al. ................ 714/309 |
| 5,542,055 A | | 7/1996 | Amini et al. ................ 710/306 |
| 5,548,587 A | * | 8/1996 | Bailey et al. ............. 370/395.7 |
| 5,581,714 A | | 12/1996 | Amini et al. ................ 710/315 |
| 5,592,622 A | | 1/1997 | Isfeld et al. ................. 709/207 |
| 5,600,650 A | | 2/1997 | Oskouy ........................ 370/468 |
| 5,659,718 A | * | 8/1997 | Osman et al. ............... 713/400 |
| 5,664,116 A | * | 9/1997 | Gaytan et al. ............... 709/234 |
| 5,673,279 A | * | 9/1997 | Oskouy et al. .............. 714/819 |
| 5,687,316 A | * | 11/1997 | Graziano et al. ........... 709/250 |
| 5,793,953 A | * | 8/1998 | Yeung et al. ................ 709/250 |
| 5,881,313 A | * | 3/1999 | Ramakrishnan et al. ...... 710/40 |

FOREIGN PATENT DOCUMENTS

EP 0631241 12/1994

* cited by examiner

Primary Examiner—Kenneth R. Coulter
(74) Attorney, Agent, or Firm—Blakely Sokoloff Taylor Zafman

(57) ABSTRACT

A network adapter for allowing packet data to be separated over multiple bus targets, without impact to input/output bus bandwidth or network performance, having: a bus interface circuit; a bus protocol circuit coupled to the bus interface circuit; a burst dispatcher circuit coupled to the bus protocol circuit; a network interface coupled to a read processing circuit and a write processing circuit, wherein the read processing circuit and the write processing circuit are coupled to the burst dispatcher; and, a synchronization and buffering circuit coupled to the bus protocol circuit, the burst dispatcher circuit, the read processing circuit and the write processing circuit.

A method for transferring packet data between a first bus target, a second bus target, and the network adapter comprising the steps of creating a set of descriptor entries in the network adapter, wherein one descriptor entry is generated for each portion of each packet to be transmitted between either the first bus target or the second bus target, and the network adapter; and, transferring a portion of packet data from either the first bus target or the second bus target to the network adapter, wherein the bus target on which the portion of packet data is contained is described by one of the set of descriptor entries.

14 Claims, 15 Drawing Sheets

FIG. 7a

Read Dispatcher look ur_table

Input for generating control words for read operations:
```
.inputnames    rd_addr (5)
.inputnames    rd_addr (4)
.inputnames    rd_addr (3)
.inputnames    rd_addr (2)
.inputnames    rd_addr (1)
.inputnames    rd_addr (0)
.inputnames    rd_size_case (2)
.inputnames    rd_size_case (1)
.inputnames    rd_size_case (0)
.inputnames    ext (bus_data_width)
.inputnames    burst_sup(2)
.inputnames    burst_sup(1)
.inputnames    burst_sup(0)
.inputnames    subburst_cnt_q(1)
.inputnames    subburst_cnt_q(0)
```

Control words for read operations is made up of the following elements:
```
.outputnames   size_out (2)
.outputnames   size_out (1)
.outputnames   size_out (0)
.outputnames   subeti (3)
.outputnames   subeti (2)
.outputnames   subeti (1)
.outputnames   subeti (0)
.outputnames   subburst_cat (1)
.outputnames   subburst_cat (0)
.outputnames   rd_sub_burst_rq
.outputnames   addr_sel (1)
.outputnames   addr_sel (0)
.outputnames   add_sel (1)
.outputnames   add_sel (0)
.outputnames   last_rd_subburst
.outputnames   first_or_only_rd_subburst
```

\#
\#rd_size cases are: (rd_adj_size is rd_size plus paddings to make word
\#boundary alignments – necessary for correct Sbus transfers

FIG. 7b

```
# case = 000 if rd_adj_size <=8 bytes
# case = 001 if rd_adj_size >8 <=16 bytes
# case = 010 if rd_adj_size >16 <=24 bytes
# case = 011 if rd_adj_size >24 <=32 bytes
# case = 100 if rd_adj_size >32 <=40 bytes
# case = 101 if rd_adj_size >40 <=48 bytes
# case = 110 if rd_adj_size >48 <=64 bytes
# - means dont care
# ext means 32 bit or 54 bit
# subburst_cnt counts number of subbursts (the input to register subburstcnt)
# subeti is partial etc field of 64 bit sbus protocol
# addr_sel, add_sel are for keeping track of subburst addresses (VA of sbus
#  protocol)

#64 byte max burst cases
```

| Inputs | | | | | | Output: rd_bus_cycle_control_word | | | | | | |
|---|---|---|---|---|---|---|---|---|---|---|---|---|
| rd_addr | rd_size_case | ext | burst_sup | subburst_cnt | size_out | subeti | subburst_cnt_out | rd_sub_burst_rq | addr_sel | add_sel | last_rd_sub_burst | first_or_only_rd_subburst |
| ---- | 000 | 0 | 1-- | 00 | 100 | ---- | 00 | 0 | 01 | 00 | 1 | 1 |
| ---- | 000 | 1 | 1-- | 00 | 011 | 0100 | 00 | 0 | 01 | 00 | 1 | 1 |
| -0-- | 001 | 0 | 1-- | 00 | 100 | ---- | 00 | 0 | 00 | 00 | 1 | 1 |
| -0-- | 001 | 1 | 1-- | 00 | 011 | 0100 | 00 | 0 | 10 | 00 | 1 | 1 |
| -01- | 001 | 0 | 1-- | 00 | 100 | ---- | 00 | 0 | 10 | 00 | 1 | 1 |
| -01- | 001 | 1 | 1-- | 00 | 011 | 0101 | 00 | 0 | 11 | 00 | 1 | 1 |
| 011- | 001 | 0 | 1-- | 00 | 100 | ---- | 00 | 0 | 11 | 00 | 1 | 1 |
| 011- | 001 | 1 | 1-- | 00 | 011 | 0110 | 00 | 0 | 10 | 00 | 1 | 1 |
| -00- | 01- | 0 | 1-- | 00 | 100 | ---- | 00 | 0 | 10 | 00 | 1 | 1 |
| -00- | 01- | 1 | 1-- | 00 | 011 | 0101 | 00 | 0 | 10 | 00 | 1 | 1 |
| -01- | 010 | 0 | 1-- | 00 | 100 | ---- | 00 | 0 | 10 | 00 | 1 | 1 |
| -01- | 010 | 1 | 1-- | 00 | 011 | 0101 | 00 | 0 | 11 | 00 | 1 | 1 |
| -01- | 011 | 0 | 1-- | 00 | 100 | ---- | 00 | 0 | 11 | 00 | 1 | 1 |
| -01- | 011 | 1 | 1-- | 00 | 011 | 0110 | 00 | 0 | 11 | 00 | 1 | 1 |
| -00- | 01- | 0 | 1-- | 00 | 100 | ---- | 00 | 0 | 11 | 00 | 1 | 1 |
| -01- | 10- | 1 | 1-- | 00 | 011 | 0110 | 00 | 0 | 11 | 00 | 1 | 1 |
| 01-- | 10- | 0 | 1-- | 00 | 100 | ---- | 00 | 0 | 11 | 00 | 1 | 1 |
| ---- | 11- | 0 | 1-- | 00 | 011 | 0110 | 00 | 0 | 11 | 00 | 1 | 1 |
| ---- | 11- | 1 | 1-- | 00 | 011 | 0110 | 00 | 0 | 11 | 00 | 1 | 1 |

FIG. 7c

32 byte max burst cases

| Inputs | | | | | Output: rd_bus_cycle_control_word | | | | | | | |
|---|---|---|---|---|---|---|---|---|---|---|---|---|
| rd_addr | rd_size_case | ext | burst_sup | subburst_cnt | size_out | subeti | subburst_cnt_out | rd_sub_burst_rq | addr_sel | add_sel | last_rd_sub_burst | first_or_only_rd_subburst |
| ---- | 000 | 0 | -01- | 00 | 100 | ---- | 00 | 0 | 01 | 00 | 1 | 1 |
| ---- | 000 | 1 | -01- | 00 | 011 | 0100 | 00 | 0 | 01 | 00 | 1 | 1 |
| --0- | 001 | 0 | -01- | 00 | 100 | ---- | 00 | 0 | 00 | 00 | 1 | 1 |
| --0- | 001 | 1 | -01- | 00 | 011 | 0100 | 00 | 0 | 00 | 00 | 1 | 1 |
| -01- | 001 | 0 | -01- | 00 | 101 | 0101 | 00 | 0 | 10 | 00 | 1 | 1 |
| -01- | 001 | 1 | -01- | 00 | 011 | 0100 | 01 | 1 | 10 | 00 | 0 | 1 |
| -11- | 001 | 0 | -01- | 01 | 100 | ---- | 00 | 0 | 01 | 00 | 1 | 0 |
| -11- | 001 | 1 | -01- | 01 | 011 | 0100 | 00 | 0 | 01 | 00 | 1 | 0 |
| -00- | 010 | 0 | -01- | 00 | 101 | 0101 | 00 | 0 | 10 | 00 | 1 | 1 |
| -00- | 010 | 1 | -01- | 00 | 011 | 0100 | 01 | 1 | 10 | 00 | 0 | 1 |
| -01- | 010 | 0 | -01- | 00 | 101 | 0101 | 00 | 0 | 01 | 00 | 1 | 1 |
| -01- | 010 | 1 | -01- | 00 | 011 | 0100 | 01 | 1 | 01 | 00 | 0 | 1 |
| -01- | 011 | 0 | -01- | 00 | 101 | 0101 | 01 | 1 | 10 | 10 | 0 | 1 |
| -01- | 011 | 1 | -01- | 01 | 011 | 0100 | 00 | 0 | 10 | 10 | 1 | 0 |
| -01- | 011 | 0 | -01- | 00 | 101 | 0101 | 01 | 1 | 01 | 10 | 0 | 1 |
| -01- | 011 | 1 | -01- | 01 | 011 | 0100 | 00 | 0 | 01 | 10 | 1 | 0 |
| -01- | 10- | 0 | -01- | 00 | 101 | 0101 | 01 | 1 | 10 | 11 | 0 | 1 |
| -01- | 10- | 1 | -01- | 01 | 011 | 0100 | 00 | 0 | 10 | 00 | 1 | 0 |
| -01- | 10- | 0 | -01- | 00 | 101 | 0101 | 01 | 1 | 11 | 11 | 0 | 1 |
| -01- | 10- | 1 | -01- | 01 | 011 | 0100 | 00 | 0 | 11 | 00 | 1 | 0 |
| -01- | 11- | 0 | -01- | 00 | 101 | 0101 | 01 | 1 | 11 | 11 | 0 | 1 |
| -01- | 11- | 1 | -01- | 01 | 011 | 0100 | 00 | 0 | 11 | 11 | 1 | 0 |

FIG. 7d

16 byte max burst cases

| Inputs | | | | | | | | Output: rd_bus_cycle_control_word | | | | | |
|---|---|---|---|---|---|---|---|---|---|---|---|---|---|
| rd_addr | rd_size_case | ext | burst_sup | subburst_cnt | size_out | subetl | subburst_cnt_out | rd_sub_burst_rq | addr_sel | add_sel | last_rd_sub_burst | first_or_only_rd_subburst |
| ---- | 000 | 0 | 001 | 00 | 100 | ---- | 00 | 1 | 01 | 00 | 1 | 1 |
| ---- | 000 | 1 | 001 | 00 | 011 | 0100 | 00 | 0 | 01 | 00 | 1 | 1 |
| -0-- | 001 | 0 | 001 | 00 | 100 | ---- | 00 | 1 | 01 | 00 | 1 | 1 |
| -0-- | 001 | 1 | 001 | 00 | 011 | 0100 | 00 | 1 | 00 | 00 | 1 | 1 |
| -1-- | 001 | 0 | 001 | 00 | 100 | ---- | 01 | 1 | 01 | 00 | 0 | 1 |
| -1-- | 001 | 1 | 001 | 01 | 011 | 0100 | 01 | 0 | 01 | 10 | 1 | 0 |
| -1-- | 001 | 1 | 001 | 00 | 100 | ---- | 01 | 1 | 00 | 00 | 0 | 1 |
| 01-- | 010 | 0 | 001 | 01 | 011 | 0100 | 01 | 0 | 01 | 10 | 1 | 0 |
| 01-- | 010 | 1 | 001 | 00 | 100 | ---- | 01 | 1 | 01 | 00 | 0 | 1 |
| 01-- | 010 | 1 | 001 | 01 | 011 | 0100 | 01 | 0 | 01 | 10 | 1 | 0 |
| -1-- | 010 | 0 | 001 | 00 | 100 | ---- | 01 | 1 | 01 | 00 | 0 | 1 |
| -1-- | 010 | 1 | 001 | 01 | 011 | 0100 | 01 | 0 | 01 | 10 | 1 | 0 |
| -1-- | 010 | 1 | 001 | 00 | 100 | ---- | 01 | 1 | 00 | 00 | 0 | 1 |
| 010- | 011 | 0 | 001 | 01 | 011 | 0100 | 01 | 0 | 01 | 10 | 1 | 0 |
| 010- | 011 | 1 | 001 | 00 | 100 | ---- | 01 | 1 | 01 | 00 | 0 | 1 |
| 010- | 011 | 1 | 001 | 01 | 011 | 0100 | 10 | 0 | 01 | 10 | 0 | 0 |
| 011- | 011 | 0 | 001 | 00 | 100 | ---- | 01 | 1 | 01 | 00 | 0 | 1 |
| 011- | 011 | 1 | 001 | 01 | 011 | 0100 | 01 | 0 | 01 | 10 | 1 | 0 |
| 011- | 011 | 1 | 001 | 00 | 100 | ---- | 01 | 1 | 00 | 00 | 0 | 1 |
| -1-- | 100 | 0 | 001 | 00 | 100 | ---- | 01 | 1 | 01 | 11 | 0 | 1 |
| -1-- | 100 | 1 | 001 | 01 | 011 | 0100 | 10 | 0 | 01 | 10 | 0 | 0 |
| -1-- | 100 | 1 | 001 | 10 | 100 | ---- | 10 | 1 | 01 | 11 | 0 | 1 |
| -1-- | 100 | 0 | 001 | 10 | 011 | 0100 | 10 | 0 | 01 | 10 | 1 | 0 |
| -1-- | 100 | 1 | 001 | 00 | 100 | ---- | 01 | 1 | 01 | 00 | 0 | 1 |
| -1-0 | 101 | 0 | 001 | 01 | 011 | 0100 | 01 | 0 | 01 | 10 | 1 | 0 |
| -1-0 | 101 | 1 | 001 | 00 | 100 | ---- | 01 | 1 | 01 | 11 | 0 | 1 |
| -1-0 | 101 | 0 | 001 | 01 | 011 | 0100 | 10 | 0 | 01 | 10 | 0 | 0 |
| -1-0 | 101 | 1 | 001 | 10 | 100 | ---- | 10 | 1 | 01 | 11 | 0 | 1 |
| -1-0 | 101 | 0 | 001 | 10 | 011 | 0100 | 10 | 0 | 01 | 10 | 1 | 0 |
| -1-0 | 101 | 1 | 001 | 10 | 011 | 0100 | 00 | 0 | 01 | 11 | 1 | 0 |

Write Dispatcher lookup table

Input for generating control words for write operations:
.inputnames  wr_size_case (2)
.inputnames  wr_size_case (1)
.inputnames  wr_size_case (0)
.inputnames  ext (bus_data_width)
.inputnames  burst_sup (2)
.inputnames  burst_sup (1)
.inputnames  burst_sup (0)
.inputnames  subburst_cnt_q (1)
.inputnames  subburst_cnt_q (0)

Control words for read operations is made up of the following elements:
.outputnames size_out (2)
.outputnames size_out (1)
.outputnames size_out (0)
.outputnames subeti (3)
.outputnames subeti (2)
.outputnames subeti (1)
.outputnames subeti (0)
.outputnames subburst_cnt (1)

| --- | 101 | 0 | 001 | 00 | 100 | -- | 01 | 1 | 01 | 00 | 0 | 1 |
| --- | 101 | 0 | 001 | 01 | 100 | -- | 10 | 1 | 01 | 10 | 0 | 0 |
| --- | 101 | 0 | 001 | 10 | 100 | -- | 11 | 1 | 01 | 11 | 0 | 0 |
| --- | 101 | 0 | 001 | 11 | 100 | -- | 00 | 0 | 01 | 01 | 1 | 1 |
| --- | 101 | 1 | 001 | 00 | 011 | 0100 | 01 | 1 | 01 | 00 | 0 | 0 |
| --- | 101 | 1 | 001 | 01 | 011 | 0100 | 10 | 1 | 01 | 10 | 0 | 1 |
| --- | 101 | 1 | 001 | 10 | 011 | 0100 | 11 | 0 | 01 | 11 | 0 | 0 |
| --- | 101 | 1 | 001 | 11 | 100 | -- | 00 | 1 | 11 | 00 | 0 | 1 |
| --- | 11- | 0 | 001 | 00 | 100 | -- | 01 | 1 | 11 | 01 | 0 | 0 |
| --- | 11- | 0 | 001 | 01 | 100 | -- | 10 | 0 | 11 | 10 | 0 | 0 |
| --- | 11- | 0 | 001 | 10 | 100 | -- | 11 | 1 | 11 | 11 | 1 | 1 |
| --- | 11- | 1 | 001 | 00 | 011 | 0100 | 00 | 1 | 11 | 00 | 0 | 0 |
| --- | 11- | 1 | 001 | 01 | 011 | 0100 | 01 | 0 | 11 | 10 | 1 | 0 |
| --- | 11- | 1 | 001 | 10 | 011 | 0100 | 10 | 1 | 11 | 11 | 0 | 1 |
| --- | 11- | 1 | 001 | 11 | 011 | 0100 | 11 | 0 | 11 | 01 | 1 | 0 |

```
.outputnames    subburst_cnt (0)
.outputnames    wr_sub_burst_rq
.outputnames    addr_sel
.outputnames    add_sel (1)
.outputnames    add_sel (0)
.outputnames    last_wr_subburst
.outputnames    first_or_only_wr_subburst wr_size_case = 64 bit mode ? dont_care : ((reg_wr_size <= 8) ? 000
: ((reg_wr_size <= 16) ? 010 : ((reg_wr_size <=32)
#                                    ? 011 : ((reg_wr_size <= 40) ? 100 : ((reg_wr_size <= 48) ? 101 : 110))));
```

FIG. 7g

| Inputs | | | | Output: rd_bus_cycle_control_word | | | | | | | |
|---|---|---|---|---|---|---|---|---|---|---|---|
| wr_size_case | ext | burst_sup | subburst_cnt | size_out | subeti | subburst_cnt_out | wr_sub_burst_rq | addr_sel | add_sel | last_wr_subburst | first_or_only_wr_subburs |
| 000 | 0 | 1-- | 00 | 110 | ---- | 00 | 0 | 0 | 00 | 1 | 1 |
| 000 | 1 | 1-- | 00 | 011 | 0110 | 00 | 0 | 0 | 00 | 1 | 1 |
| 001 | 0 | 01- | 00 | 100 | ---- | 00 | 0 | 0 | 00 | 1 | 1 |
| 001 | 1 | 01- | 00 | 011 | 0100 | 00 | 0 | 0 | 00 | 1 | 1 |
| 001 | 0 | 001 | 00 | 100 | ---- | 00 | 0 | 0 | 00 | 1 | 1 |
| 001 | 1 | 001 | 00 | 011 | 0100 | 00 | 0 | 0 | 00 | 1 | 1 |
| 010 | 0 | 01- | 00 | 100 | ---- | 00 | 0 | 0 | 00 | 1 | 1 |
| 010 | 1 | 01- | 00 | 011 | 0100 | 00 | 0 | 0 | 00 | 1 | 1 |
| 010 | 0 | 001 | 00 | 100 | ---- | 00 | 0 | 0 | 00 | 1 | 1 |
| 010 | 1 | 001 | 00 | 011 | 0101 | 00 | 0 | 0 | 00 | 1 | 1 |
| 011 | 0 | 01- | 00 | 101 | ---- | 00 | 0 | 0 | 00 | 1 | 1 |
| 011 | 1 | 01- | 00 | 011 | 0100 | 00 | 0 | 0 | 00 | 1 | 1 |
| 011 | 0 | 001 | 00 | 100 | 0100 | 01 | 1 | 0 | 00 | 0 | 1 |
| 011 | 0 | 001 | 01 | 011 | ---- | 00 | 0 | 1 | 01 | 1 | 0 |
| 011 | 1 | 001 | 00 | 100 | 0100 | 01 | 1 | 0 | 00 | 0 | 1 |
| 011 | 1 | 001 | 01 | 011 | 0101 | 00 | 0 | 1 | 01 | 1 | 0 |
| 100 | 0 | 001 | 00 | 100 | 0100 | 01 | 1 | 0 | 00 | 0 | 1 |
| 100 | 0 | 001 | 01 | 100 | ---- | 00 | 0 | 1 | 01 | 1 | 0 |
| 100 | 1 | 001 | 00 | 100 | 0100 | 01 | 1 | 0 | 00 | 0 | 1 |
| 100 | 1 | 001 | 01 | 011 | 0101 | 00 | 0 | 1 | 01 | 1 | 0 |
| 101 | 0 | 001 | 00 | 100 | 0100 | 01 | 1 | 0 | 00 | 0 | 1 |
| 101 | 0 | 001 | 01 | 100 | 0100 | 10 | 1 | 1 | 01 | 0 | 0 |
| 101 | 0 | 001 | 10 | 100 | ---- | 00 | 0 | 1 | 10 | 1 | 0 |
| 101 | 1 | 001 | 00 | 100 | 0100 | 01 | 1 | 0 | 00 | 0 | 1 |
| 101 | 1 | 001 | 01 | 100 | 0100 | 10 | 1 | 1 | 01 | 0 | 0 |
| 101 | 1 | 001 | 10 | 011 | 0100 | 00 | 1 | 1 | 00 | 1 | 0 |

Arbitration Logic

```
begin
    case (choice)
            WRITE:
5
            begin
                if (sb_rd_ack && -block_further_check)
//block_further_check is flag
10  //sb_rd_ack is acknowledge of
    //ATM_SYS's rd request.
                    begin
                        choice <= READ;
                        block_further_check <= TRUE;
15                  end
                else if (sb_wr_ack && -sb_rd_ack && -block_further_check)
                    begin
                        choice <= WRITE;
                        block_further_check < TRUE;
20                  end //see if condition for unblock
    //(to check any new request has been granted)
                if (sb_first_wr_ack)
25  //got the first DMA write slave ack from IO bus
                    block_further_check <= FALSE;
                end
30          READ:
            begin
                if (sb_wr_ack && -block_further_check)
35                  begin
                        choice <= WRITE;
                        block_futher_check <= TRUE;
                    end
                else if (sb_rd_ack && -sb_wr_ack && -block_further_check)
40                  begin
                        choice <= READ;
                        block_further_check <= TRUE;
                    end
45  //see if condition for unblock
    //(to check any new request has been granted)
                if (sb_first_rd_Ack)
                    block_further_check <= FALSE;
50          end
        endcase
    end
    //sel to the mux is a registered version of: -bus_grant & choice
```

METHOD AND APPARATUS FOR ALLOWING PACKET DATA TO BE SEPARATED OVER MULTIPLE BUS TARGETS

This is a divisional application of Ser. No. 08/499,199 filed Jul. 7, 1995, now U.S. Pat. No. 5,793,953, issued Aug. 11, 1998.

1. Field of the Invention

BACKGROUND OF THE INVENTION

The present invention relates to the field of use of high speed computer networking. More particularly, the present invention relates to methods and apparatus for allowing flexibility of network data source and destination as well as alleviation of memory bus traffic through the support of one or more system bus target devices, where each device can have different bus characteristics.

2. Description of Related Art

Presently, a computer system connects to and communicates with other computer systems in a computer network through the use of network adapters. A network adapter typically has two connections, one to the computer network and another to the input/output (I/O) bus of the computer system. Through the use of the I/O bus, the network adapter communicates with the host processor of the computer system which in turn is connected to a host memory through the use of a memory bus. The network adapter also communicates with other components of the computer system using the I/O bus, which include such devices as storage device interfaces, frame buffers, coprocessors, Erasable Programmable Read Only Memories (EPROM's) and network physical layer devices.

One function of the network adapter is to transfer data between the host memory and the network. The data contained in the host memory which is to be transferred is packetized. Each packet is composed of a header section and a data section. When the host processor needs to transfer data from the host memory out onto the network, the network adapter is responsible for reading the portion of the host memory that contains the packets, performing any necessary processing of the packets into a suitable form for transfer and sending the data out onto the network.

Storage of the outgoing data in host memory before it is transferred to the network adapter effectively doubles the number of transfers that is accomplished over the memory bus. In addition to increasing the demand on the processing resources of the host processor, the multiplicity of transfers is also inefficient use of both the bandwidths of the host memory and the I/O bus. These problems are exacerbated in situations where the computer system needs to provide a constant stream of data from the host memory to the network adapter.

Alternatively, instead of being contained in the host memory, the packets to be transferred can be completely contained in a second device on the I/O bus. However, this approach also has associated problems. For example, the header portions of a packet is processed by the host processor of the computer system. If the data to be transferred is completely contained in the memory of the second I/O device, then either the network adapter or the second I/O device has to incorporate processing circuitry to process the header or other special control portions of the packets to be transferred.

Examples of the problems associated with current approaches to dealing with the storage and transferring of network data can be seen where the I/O bus of the computer system is a bus conforming to the Institute of Electronics and Electrical Engineers (IEEE) 1496-1993 SBus specification and the network conforms to an asynchronous transfer mode (ATM) network. ATM is a high-speed, connection-oriented switching and multiplexing technology that uses cells to transmit different types of data traffic simultaneously. These different types of traffic may include voice and video data in addition to traditional computer data. For example, in a video conference session using computer systems that contain audio and video digitizing capability, the host computer can transfer voice and video along with other data over the ATM network. ATM is asynchronous in that information streams can be sent independently without a common clock.

In multimedia applications where the computer system is acting as a multifunctional resource controller such as an audio/video server, image storage and data routing, the data stream composing the audio and video requested by a client computer system usually constitute a large amount of data. As it would be uneconomical to build computer systems with host memory large enough to store the amount of data required, this multimedia data is contained one or more SBus storage devices and must be loaded into the host memory in portions small enough to fit in the host memory. Each portion of multimedia data is then transferred over the SBus, by the host computer, to the network adapter to be segmented and packaged into cells to be delivered over the ATM network before the next portion is loaded into host memory. As the amount of the multimedia data requested becomes larger, the host processor has to devote more and more of its processing resources to satisfy the request. Also, if the data to be loaded into the host memory is distributed over more than one storage device, the host processor must spend time loading the data from different sources.

Moreover, in the multimedia application, the majority of the memory bus bandwidth and resources will be monopolized by the intensive network data transfer requirements and cannot be used for other processing needs. This is because of the large amount of network data contained in host memory which has to be transferred to the network adapter. Conversely, if the memory bus is being used to service other memory requests, and thus is unavailable for transferring network data, it will be difficult to maintain a constant transfer of the data that is contained inside the host memory to the network adapter.

In cases where the data is split over several SBus storage devices, each portion can be directly transferred from the SBus storage device to the network adapter. However, as mentioned before, extra cost will be incurred in providing the extra processing circuitry in either the SBus storage devices or the network adapter needed to process the header and other special control portions of the packet. Moreover, the network adapter has to devote a portion of its resources to process the control portions of the packet, which results in a loss of performance.

SUMMARY

In solving the inefficiency and loss of system performance caused by storing all the network data in either the host memory or a second bus target device, the present invention provides a method and apparatus for allowing data which comprise a packet to be spread over numerous storage devices, including the host memory. The present invention can (1) acquire and assemble the data comprising the header and data portions of the packets to be transferred over a computer network from several sources; and (2) distribute and divide the data received from the computer network over several local bus devices, including the host memory. The present invention is able to achieve the above capabilities with no wasted bus cycles even when the devices over which the data is distributed have different bus characteristics.

By allowing packet data to be spread over both host memory and one or more separate bus target devices, the present invention reduces the load on the system memory bus and allows more efficient use of memory bus bandwidth. For example, if the amount of network data that has to be transferred from the host memory is reduced, thus releasing the memory bus for other processing needs. Also, it will be easier to provide a constant stream of data to the computer network as a majority of the resources of the memory bus does not have to be dedicated for transferring network data.

The present invention achieves the above functions by using a network adapter which contains an I/O bus interface, a burst dispatcher, a synchronization and buffering logic, and a network media interface. The I/O bus interface is responsible for sending and receiving data to and from the I/O bus and can also initiate bus transactions. The burst dispatcher generates a control word for each bus cycle that controls bus characteristics of the next bus transaction that is performed by the I/O bus interface. This control word is based on the characteristics of the device with which the data is to be exchanged. The network media interface prepares the data for transmission over the network media. The synchronization and buffering logic acts as a buffer to store (1) the data received from the I/O bus interface before it is transmitted to the network media interface, and (2) the data received from the network media interface before it is transmitted to the I/O bus interface. The synchronization and buffering logic buffers the data until-the cycle during which each respective interface is ready to receive the data.

In operation, the host processor initializes a set of I/O configuration registers inside the network adapter at system initialization to contain the I/O transfer characteristics of each device connected to an I/O bus. During normal transmit operations where the data is being sent to the computer network, host processor would create one descriptor entry for each portion of each packet to be transmitted from the computer. The host processor would then pass the descriptor entries to the network adapter and the network adapter would be responsible for reading the data from the bus target device described by the descriptor entry using the I/O bus interface and burst dispatcher. The data that is read by the I/O bus interface is then passed to the synchronization and buffering logic, which sends the data to the network media interface.

Other objects, features and advantages of the present invention will be apparent from the accompanying drawings, and from the detailed description that follows below.

BRIEF DESCRIPTION OF THE DRAWINGS

The objects, features and advantage of the present invention will be apparent from the following detailed description in which:

Figure 7H:
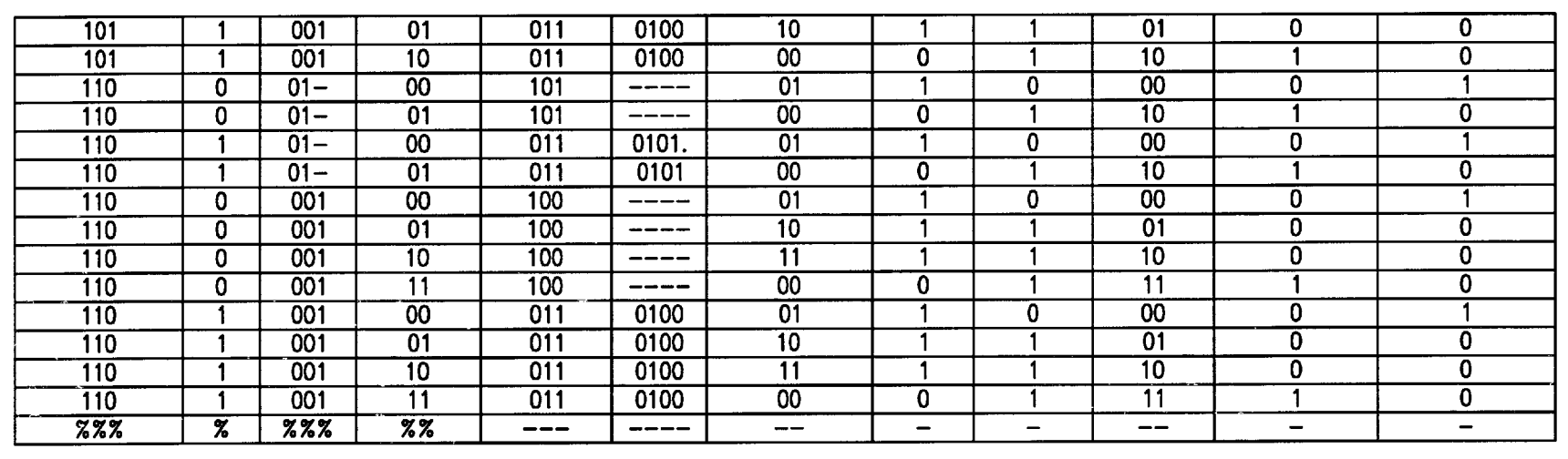

FIGS. 7a–7h illustrate an example of lookup tables implemented by read dispatch lookup tables 357.

FIG. 8 is an algorithm for implementing arbitration logic 375.

DETAILED DESCRIPTION OF THE INVENTION

The present invention provides a method and apparatus that allows a computer system to choose the source and destination of stored network packet data as well as alleviating the traffic generated on a memory bus of the computer system without degradation of system performance nor limiting the choices of devices that have different input/output (I/O) bus characteristics. For purposes of explanation, specific embodiments are set forth to provide a thorough understanding of the present invention. However, it will be understood by one skilled in the art, from reading this disclosure, that the invention may be practiced without these details. Further, although the present invention is described through the use of (1) I/O buses that conform to the Institute of Electronics and Electrical Engineers (IEEE) 1496-1993 SBus specification and (2) networks that support Asynchronous Transfer Mode (ATM) networking technology; most, if not all, aspects of the invention apply to I/O buses over which I/O devices with different data burst and width characteristics are supported and networks which support high speed mixed traffic such as multimedia traffic. Moreover, well-known elements, devices, process steps and the like are not set forth in detail in order to avoid obscuring the present invention.

Figure 1:
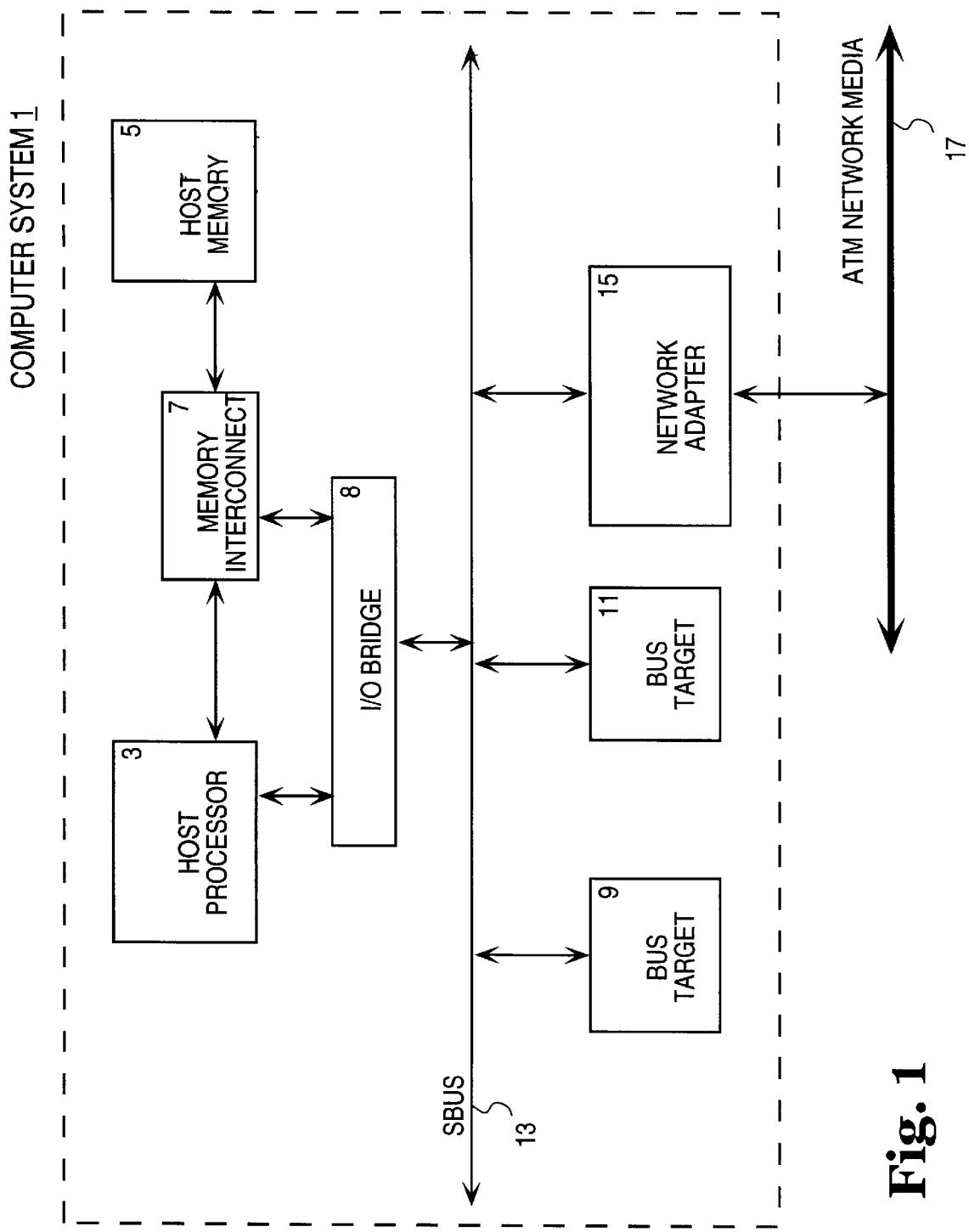
FIG. 1 is a block diagram of a computer system containing a network adapter configured in accordance with one embodiment of the current invention.

FIG. 1 illustrates an exemplary computer system incorporating a network adapter of the present invention. Computer system 1 contains a host processor 3 connected to a host memory 5 through a memory interconnect 7. Host processor 3 is also connected to a first bus target 9 and a second bus target 11 through an I/O bridge 8 by the use of a SBus 13 as an I/O bus which conforms to the IEEE 1496-1993 SBus specification and which contains a SBus controller (not shown). Also connected to SBus 13 is a network adapter 15 which is used to connect computer system 1 to an ATM network media 17. Host memory 5 can be accessed by all devices on SBus 13 through the use of I/O bridge 8 and memory interconnect 7.

Both bus target 9 and bus target 11 are intended to represent a broad category of standard SBus devices and SBus cards. For example, bus target 9 can be a disk controller card to support devices using the Small Computer Systems Interface (SCSI) device standards and bus target 11 can be a frame buffer card. It is assumed that bus target 9 and bus target 11 contain data storage spaces which can be addressed and be read or written.

Host memory 5 is intended to represent a broad category of memory found as standard computer memory storage such as cache or main memory. Host memory 5 stores executable code and other data used in the operation of host processor 3. In addition, as described below, host memory 5 contains data and data structures used by network adapter 15 to transmit and receive data to and from ATM network media 17. Access is accomplished through regular memory-format instructions.

Figure 2:
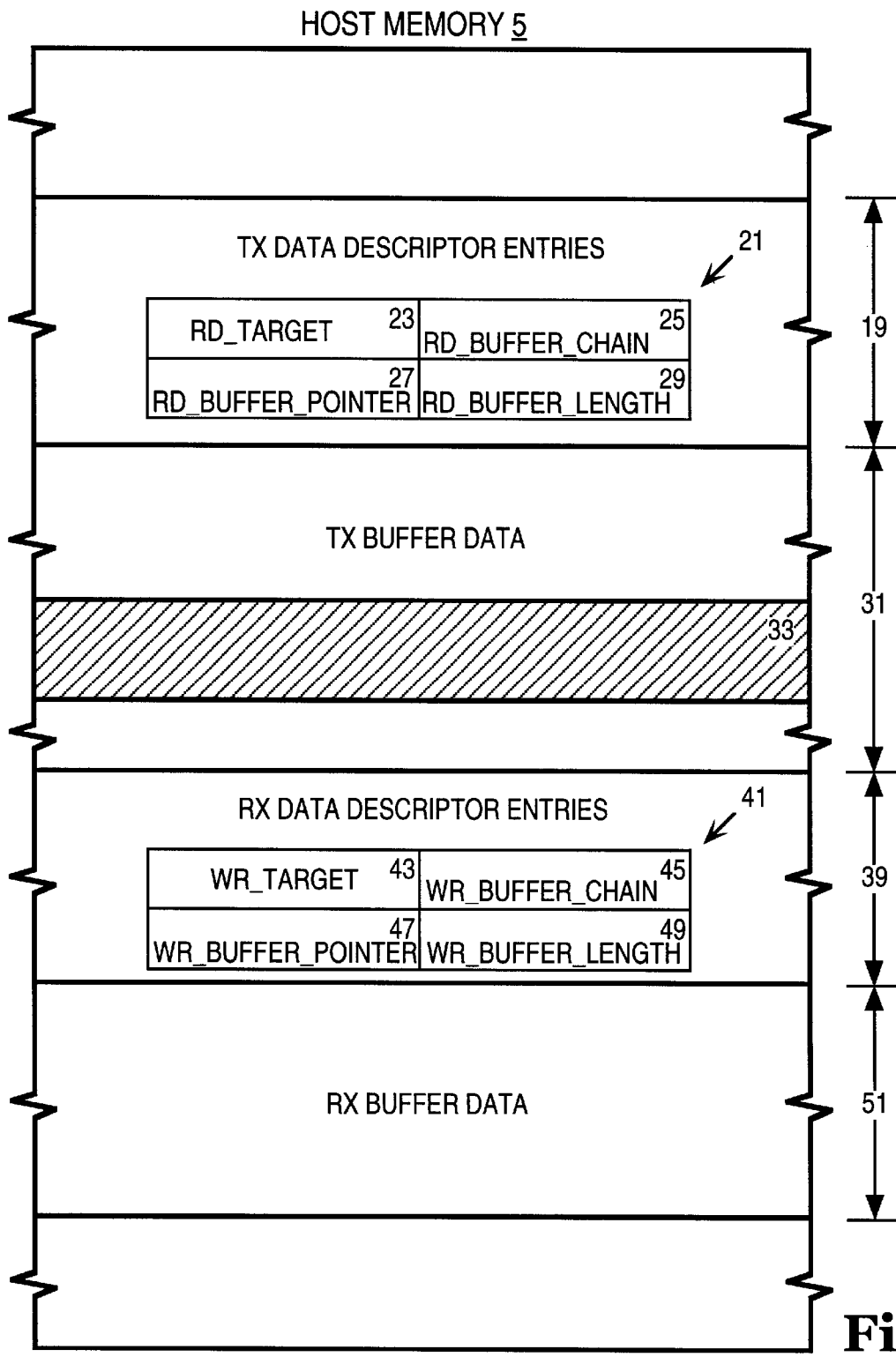
FIG. 2 illustrates a host memory of the computer system which contains data structures and data used in the operation of the current invention.

FIG. 2 illustrates a portion 19 of host memory 5 which contains the transmission (TX) data descriptor entries used to describe the packets to be transmitted. Host memory 5 also contains a TX buffer data portion 31 to act as storage buffers for packet data to be transmitted to network adapter 15.

A packet is usually composed of a header portion and a data portion. In certain cases such as where there has been an error in the transmission of a packet, or where required for control purpose, a packet will only contain a header portion. The data which constitute the header and data portions of the packet can be either stored in one storage buffer or divided into and stored in numerous storage buffers. Storage buffers can be of any size. Typically, the first storage buffer is large enough to contain at least the data comprising the header portion of the packet as the header portion of each packet is preferably fully contained in the first storage buffer. However, there is no requirement that all the storage buffers containing the data for the same packet be located in the memory of one SBus device. In other words, the data which is associated with a packet can be contained in a set of storage buffers located in the memories of more than one SBus device.

For example, in a case where the data comprising a packet is split into four storage buffers—a first storage buffer which contains the header portion of the packet, and a second, third and fourth storage buffers which contain the remaining data of the packet—the first storage buffer can be located in the memory of a first SBus device such as host memory 5, where the processing of the header is intended to be performed; the second storage buffer can be located in the memory of a second storage device; and the third and fourth storage buffer can be located in the memory of a third storage device.

Each storage buffer is described by a data descriptor entry, which is composed of a set of fields which describes the characteristics of the storage buffer. For example, a TX data descriptor entry 21 for a storage buffer 33 that contains part or all of a packet to be transmitted consists of:

a rd_target field 23,
 a rd_buffer_chain field 25
 a rd_buffer_pointer field 27, and
 a rd_buffer-length field 29.

Rd_target field 23 contains information that designates which target device contains storage buffer 33. In this embodiment, rd target field 23 is a two-bit field which has three valid values: when rd_target [1:0]=[00], host memory 5 is the target that contains the storage buffer; when rd_target [1:0]=[01], bus target 9 is the target that contains the storage buffer; and when rd_target [1:0]=[10], bus target 11 is the target that contains the storage buffer. In FIG. 2, the two bit value of rd_target 23 would have the value of [00] as storage buffer 33 is stored in host memory 5. Alternatively, rd_target can be any number of bits to support the referencing of any number of SBus devices.

Rd_buffer_chain field 25 is a two-bit field with four valid values to indicate whether the buffer is part of a chain of storage buffers. The possible values of rd_buffer_chain fields are as shown in Table 1, below.

TABLE 1

Values of rd_buffer_chain fields

| Location of storage buffer (in a chain of buffers) | Rd_buffer_chain value [1:0] |
|---|---|
| First | 10 |
| Middle | 00 |
| Last | 01 |
| First and only storage buffer* | 11 |

*There is only one storage buffer in the chain-i.e. the storage buffer completely contains the data comprising the packet.

For example, if storage buffer 33 contains ALL the data of a packet, then the two bit value of rd_buffer_chain 25 is given a value of [11]. If storage buffer 33 is the first storage buffer in a chain of storage buffers, then the two bit value of rd_buffer_chain 25 is given a value of [10]. Similarly, if storage buffer 33 is the last storage buffer in a chain of storage buffers, then the two bit value of rd_buffer_chain 25 is given a value of [01]. Alternatively, if storage buffer 33 is not the first or last storage buffer in a chain of storage buffers, then the two bit value of rd_buffer_chain 25 is given a value of [00].

Rd_buffer_pointer field 27 contains a 32 bit address in the memory of the SBus device where storage buffer 33, which contains all or a portion of the data comprising the packet, is stored. As mentioned above, all storage buffers are less than or equal to 64 Kbytes in size. Therefore, rd_buffer_length field 29, which represents the size of storage buffer 33, is a 16 bit value. Alternatively, if storage buffers are to be greater than 64 Kbytes, then a new rd_buffer_length field must contain enough bits to address the full size of the storage buffers.

In summary, a packet is described by a set of TX data descriptor entries, where each TX data descriptor entry in the set points to a storage buffer which stores a portion of the data of the packet. As the data comprising each packet can be contained in one or more storage buffers, host processor 3 has to create one or more TX data descriptor entries for each packet that host processor 3 wants network adapter 15 to transmit.

Figure 3:
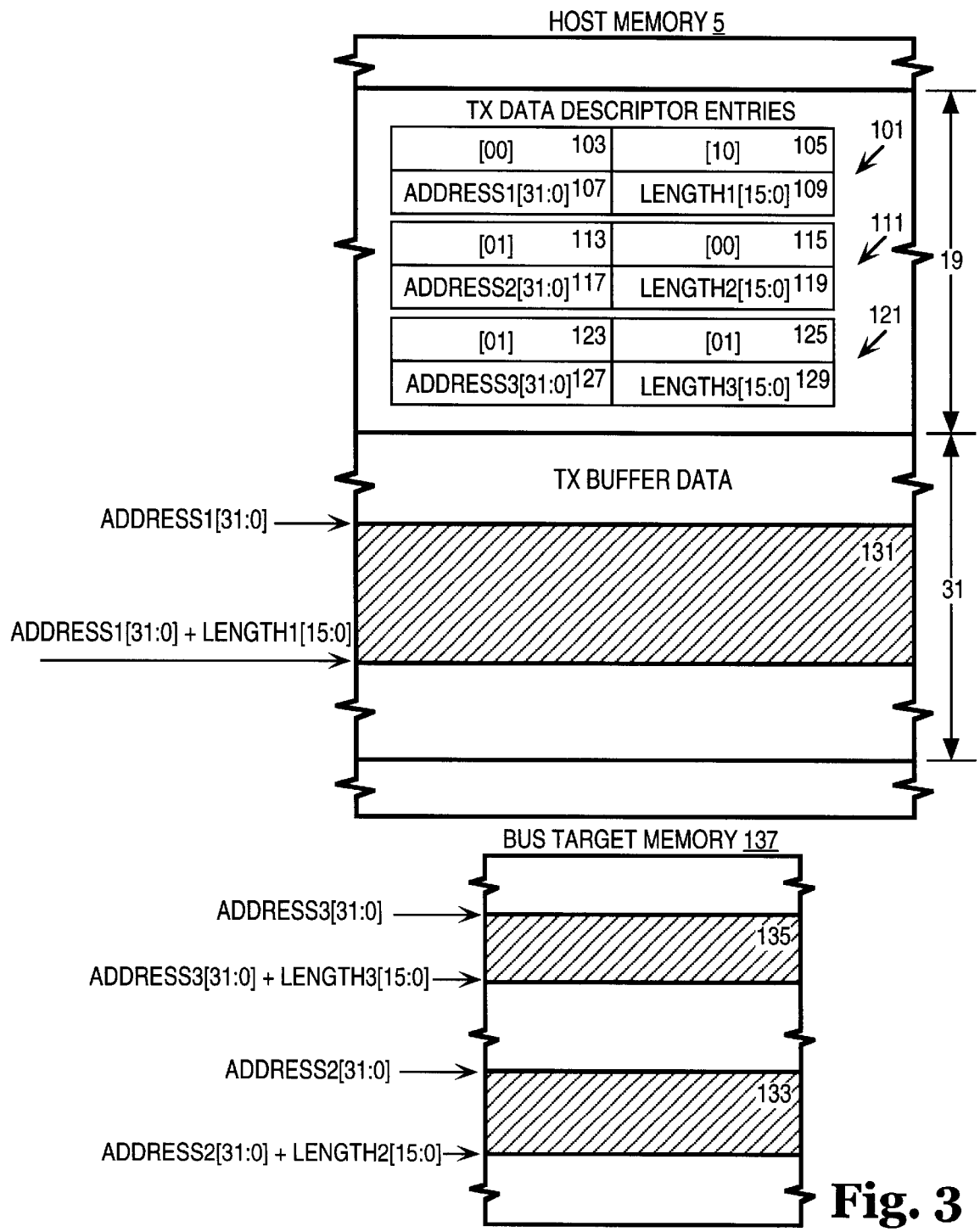
FIG. 3 illustrates the host memory and a memory space of a bus target device of the computer system having been configured in accordance with one embodiment of the current invention.

FIG. 3 illustrates an embodiment of the current invention in which the data that comprise a packet to be transmitted by network adapter 15 is stored in storage buffers contained in both host memory 5 and bus target memory 137 of bus target 9. TX data descriptor entries portion 19 contains TX data descriptor entries 101, 111 and 121, which are generated by host processor 3. TX data descriptor entries 101, 111 and 121 hold the characteristics of storage buffers 131, 133 and 135, respectively. Storage buffer 131 is contained in TX buffer data portion 31 of host memory 5 while storage buffers 133 and 135 are contained in a bus target memory 137 of bus target 9.

The data stored in storage buffers 131, 133 and 135 constitute the packet that is to be transmitted. As discussed above, storage buffer 131, being the first storage buffer in the chain of three storage buffers, is of a size that is large enough to hold the data which comprise the header portion of the packet. Storage buffers 133 and 135 contain the remaining data portion of the packet and are the second and third storage buffers in the chain of three storage buffers, respectively.

As defined, the rd_target value for a storage buffer that is contained in host memory 5 has a value of [00]. Thus, block 103 of TX data descriptor entry 101, which represents the two bit rd_target field that identifies the SBus target where storage buffer 131 is stored, holds a value of [00]. Similarly, blocks 113 and 123 both hold the value of [01] as storage buffers 133 and 135 are contained in bus target memory 137 of bus target 9, which has a rd_target value of [01].

In accordance with Table 1, block 105, which represents the two bit rd_buffer_chain field, contains a value of [10] as storage buffer 131 is the first storage buffer in the chain of storage buffers 131, 133, 135. Similarly, as storage buffer 133 is the second storage buffer in the chain, the value contained in block 115 is [00]. Block 125, which holds the rd_buffer_chain value for storage buffer 135, has a value of [01] as storage buffer 135 is the last storage buffer in the chain of storage buffers to be transmitted.

Blocks 107, 117 and 127 contain the 32-bit addresses of storage buffers 131, 133 and 135 in host memory 5, respectively. The lengths of storage buffers 131, 133 and 135, represented by 16-bit binary numbers, are held in blocks 109, 119 and 129, respectively. Thus, for example, storage buffer 131 is contained in the range of addresses of host memory 5 defined by Address1 [31:0] to the address which is the binary sum of Address1 [31:0] and Length1 [15:0]. Similarly, storage buffer 133 is contained in the range of addresses of bus target memory 181 defined by Address2 [31:0] to the address which is the binary sum of Address2 [31:0] and Length2 [15:0].

Figure 4:
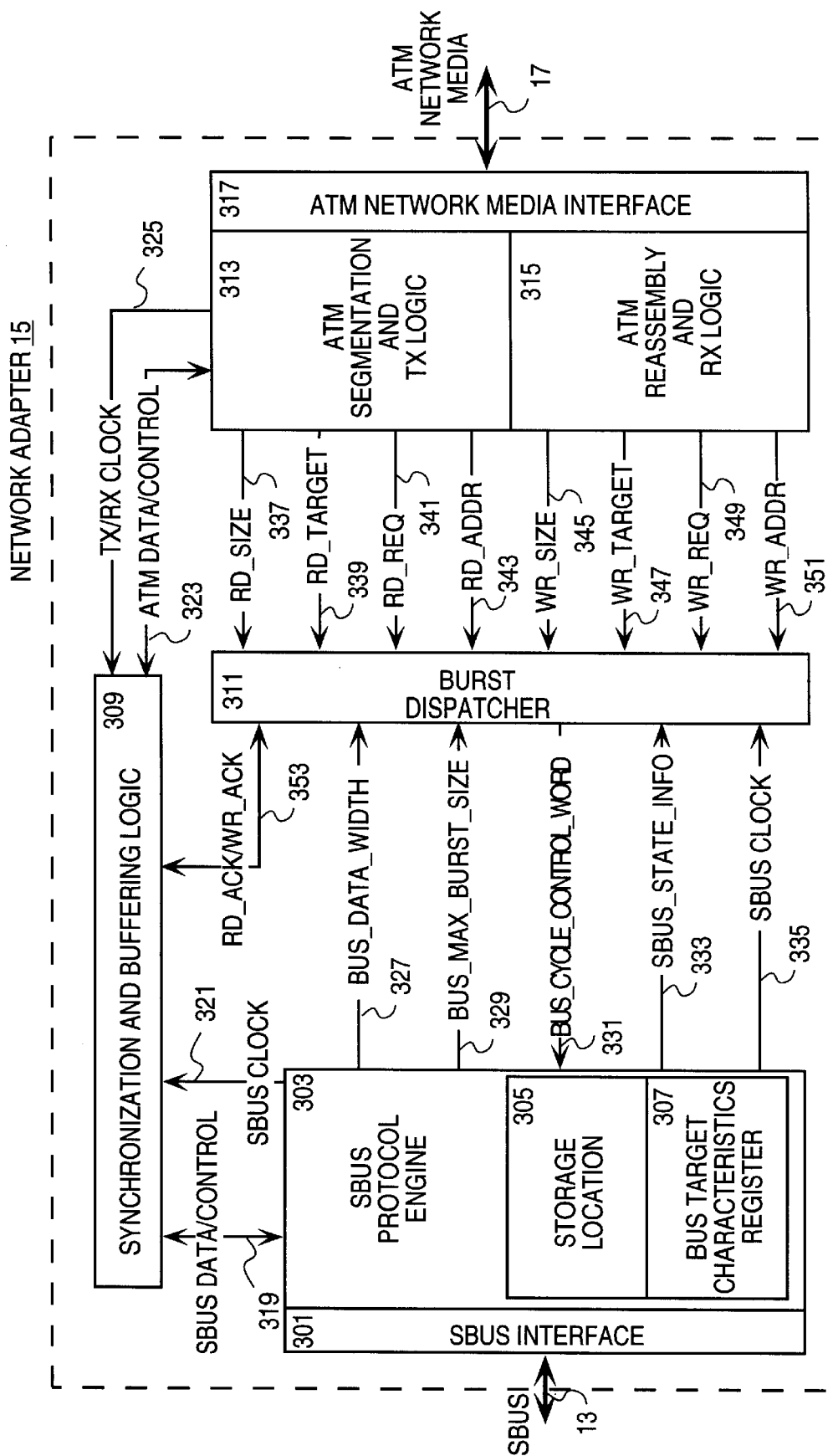
FIG. 4 is a block diagram of an embodiment of the network adapter configured in accordance with the current invention.

FIG. 4 illustrates a block diagram of an embodiment of network adapter 15 of the present invention. Network adapter 15 includes a SBus interface 301 for physically connecting network adapter 15 to SBus 13. SBus interface 301 is internally connected to SBus protocol engine 303, which contains storage location 105 and a bus target characteristics register 107. SBus protocol engine 303 is responsible for correctly asserting both SBus requests and responses as a SBus master. SBus protocol engine 303 is also responsible for responding to SBus requests as a SBus slave for programming on and off chip registers and memory.

Storage location 305 is a storage element that holds a value which corresponds to the address of the last buffer in a chain of buffers to be transmitted in a sequence. Storage location 305 is updated by host processor 3. As explained below, storage location 305 and bus target characteristics register 307 are programmed by host processor 3. Bus target characteristics register 307 contains the SBus characteristics of each SBus device which is to serve as a slave, including host memory 5. These SBus characteristics includes the maximum burst size and data width supported by the SBus system, which can be 16, 32, or 64 byte bursts per SBus cycle for the maximum burst size and 32 or 64 bits for data width. Bus target characteristics register 307 receives its value during initialization from host processor 3.

Network adapter 15 also contains an ATM network media interface 317 for physically connecting network adapter 15 with ATM network media 17. ATM network media interface 317 is coupled with both an ATM Segmentation and TX logic 313 and an ATM reassembly and RX logic 315 which performs the ATM adaption layer functions of segmentation and reassembly of packet data into and from ATM cells, respectively.

As will be discussed in detail below, burst dispatcher 311 is used to output a control word that determines the protocol dependent characteristics for each SBus cycle performed by SBus protocol engine 303 through a bus_cycle_control_ word 331 vector. Bus_cycle_control_word 331 vector is generated by burst dispatcher 311 after it receives (1) a SBus_state_info 333 from SBus protocol engine 303; (2) the preprogrammed data width and the maximum burst size supported by a SBus target device through bus_data_width 327 and bus_max_burst_size 329 signal lines of SBus protocol engine 303, respectively; (3) a rd_ack/wr_ack signal 353 and (4) either (a) the set of signals composed of rd_size 337, rd target 339, rd_req 341 and rd_addr 343 if the SBus cycle is initiated for the transmission of packet data from the SBus target device, or (b) the set of signals composed of wr_size 345, wr_target 347, wr_req 349 and wr_addr 351 if the SBus cycle is initiated for the transmission of packet data which is received from the ATM reassembly and RX logic to the SBus target device. In one embodiment, bus_cycle_control_word 331 will be equal to a value computed in accordance with the table contained in Appendix A.

Continuing to refer to FIG. 4, Synchronization and Buffering Logic 309 is connected to SBus Protocol engine 303 through SBus data/control 319 and SBus clock 321 signal lines. Synchronization and buffering logic 309 is also connected to ATM segmentation and TX logic 313 and ATM reassembly and RX logic 315 through ATM data/control 323 and TX/RX clock 325 signal lines. Synchronization and Buffering Logic 309 is responsible for buffering (1) the data received from SBus protocol engine 303 before the data is fed into ATM segmentation and TX logic 313; and (2) the data received from ATM reassembly and RX logic 315 before the data is transferred to the SBus protocol engine 303. More importantly, synchronization and buffering logic 309 is responsible for synchronizing the generation of bus_cycle_control_word 331 vector by burst dispatcher 311 to ensure sequential TX read requests as well as RX write requests are serviced over SBus 13 with no lost clock cycles in between. Synchronization and buffering logic 309 controls the generation of bus_cycle_control_word 331 vector through the use of rd_ack/wr_ack 353.

Figure 5:
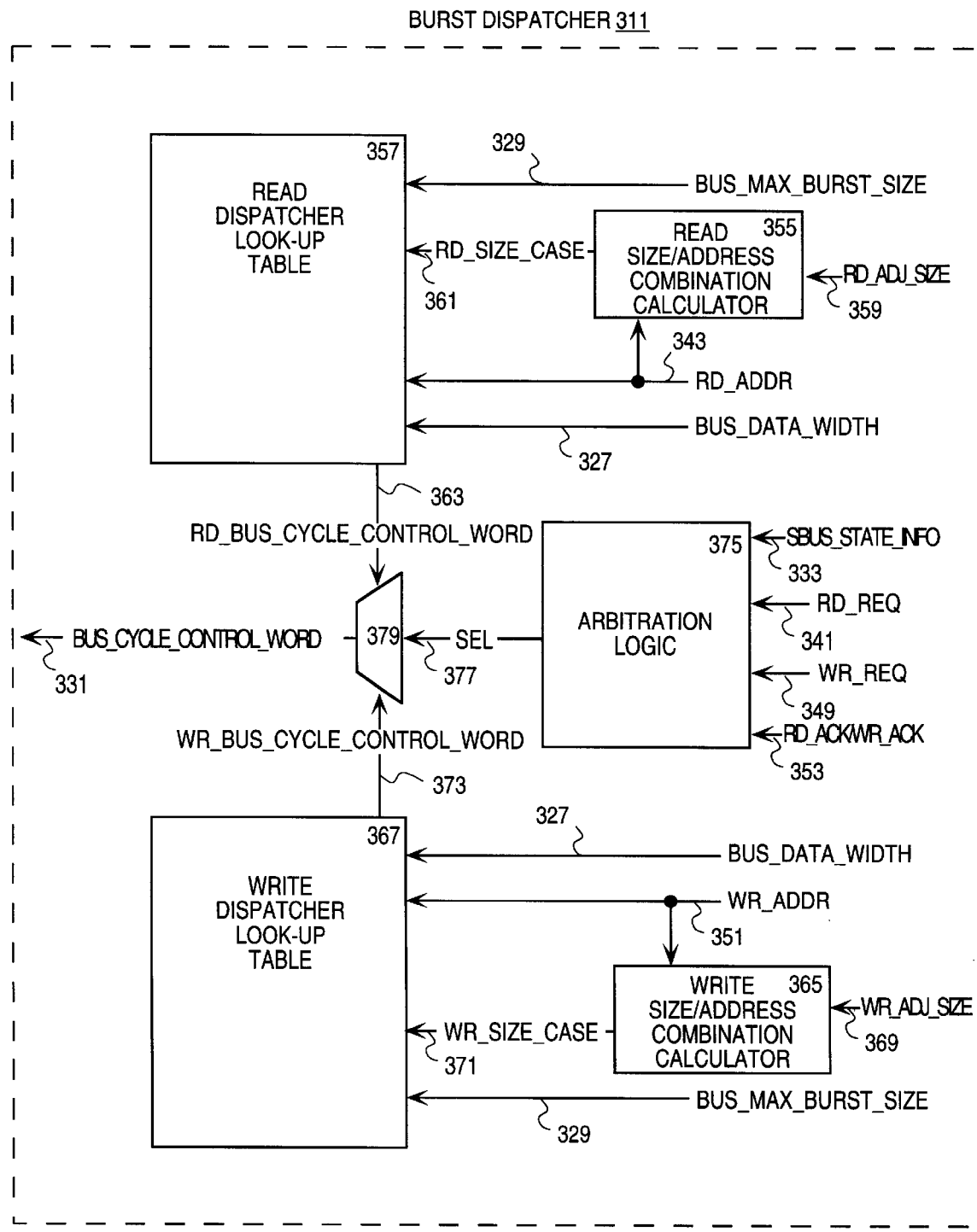
FIG. 5 is a block diagram of an embodiment of a burst dispatcher configured in accordance with the current invention.

FIG. 5 illustrates a block diagram of an embodiment of burst dispatcher 311 of the present invention. Burst dispatcher 311 includes a read size/address combination calculator 355. Read size/address combination calculator 355 receives a rd_adj_size 359 and rd_addr 343 as inputs and outputs rd_size_case 361. Rd_adj_size 359 is rd_size 337 with binary padding to fulfill the word boundary alignment requirement of SBus transfers. The value of rd_size case 361 calculated by read size/address combination calculator 355 for one embodiment is as shown in Appendix A. For example, if rd_adj_size 359 is greater than 8 bytes but less than 16 bytes, the value of rd_size case 361 equals [001].

Burst dispatcher 311 also contains a read dispatcher look-up table 357 for determining a rd_bus_cycle_ control_word 363 through the use of bux_max_burst_size 329, rd_size_case 361, rd_addr 343, and bus_data_width 327. In one embodiment, read dispatcher look-up table 357-implements the look-up tables contained in FIGS. 7a–7h.

For DMA write operations, burst dispatcher 311 contains a write size/address combination calculator 365. Write size/ address combination calculator 365 receives wr_adj_size 369 and wr_addr 351 as inputs and outputs wr_size case 371. Wr_adj_size 369 is wr_size 345 with binary padding to fulfill the word boundary alignment requirement of SBus transfers. The value of wr_size_case 371 calculated by write size/address combination calculator 365 for one embodiment is as shown in Appendix A. For example, if wr_adj_size 369 is greater than 8 bytes but less than 16 bytes, the value of wr_size case 371 equals [010].

Burst dispatcher 311 also contains a write look-up table 367 for determining a wr_bus_cycle_control_word 373 through the use of bus_max_burst_size 329, wr_size_ case 371, wr_addr 351, and bus_data_width 327. In one embodiment, write dispatcher look-up table 357 implements the look-up table contained in Appendix A.

In order to determine whether to schedule an upcoming SBus read or write DMA cycle, burst dispatcher 311 also contains an arbitration logic 375. Arbitration logic 375 receives, as inputs, SBus_state_info 333, rd_req 341, wr_req 349, and rd_ack/wr_ack 353 and outputs sel 377 to a multiplexor (MUX) 379. The value of Sbus_state_info 333 for read transactions is the logical "and" of bus request and no bus grant. The value of SBus_state_info 333 is determined by the following equations:

(i) new cycle = bus grant request and no bus grant
(ii) new cycle enable = first pulse of new cycle
(iii) update wr_bus_cycle_control_word = one cycle before (1) selecting the write cycle and (2) new cycle enable. Arbitration logic 375 implements the algorithm contained in FIG. 8.

MUX 379 outputs the value of either rd_bus_cycle_control_word 363 or wr_bus_cycle_control_word 373 on bus_cycle_control_word 331 depending on whether sel equals "WRITE" or "READ". This select based logic enables smooth transition between read and write transactions even in the event of back to back read and write transactions. Also, arbitration logic 375 allows the bus characteristics to be switched smoothly for back to back transactions to bus targets with different bus characteristics.

Figure 6:
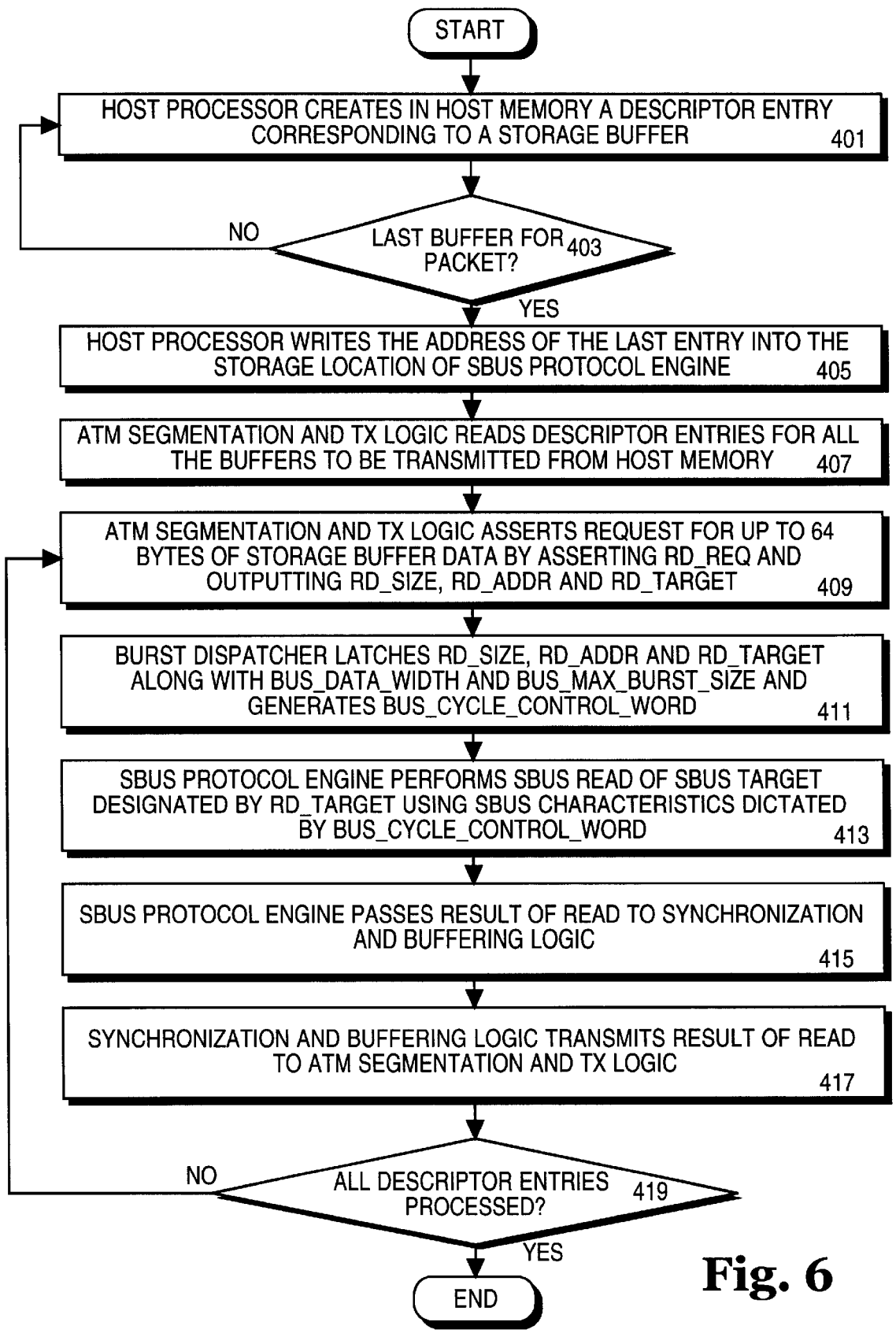
FIG. 6 is a flow diagram illustrating a method of transmitting a packet where the header and data portion of the packet is distributed between the host memory and the memory space of the bus target device.

FIG. 6 is a flow diagram illustrating a method for transmitting a packet contained on multiple SBus devices using an embodiment of the present invention. Reference will be made to the elements contained in FIGS. 1, 2 and 4 when discussing FIG. 6.

In block 401, and referring to FIG. 1 and FIG. 2, in the preferred mode of operation, host processor 3 creates one or more TX data descriptor entries in TX data descriptor entries portion 19 of host memory 5 for a packet to be transmitted. As previously discussed, there has to be one TX data descriptor entry for each storage buffer to be transmitted. Thus, as the data for a packet can be split over several storage buffers, each packet will have a set of TX data descriptor entries associated with it. As illustrated by FIG. 2, host processor 3 has created TX data descriptor entry 21 in TX data descriptor entries portion 19 for storage buffer 33.

Referring to block 403, if host processor only needs to transmit one buffer, operation would continue with block 405. Otherwise, if host processor 3 is to transmit multiple buffers belonging to one packet, then block 401 would be repeated for each buffer. Thus, if host processor 3 needed to transmit 4 buffers, then the step in block 401 would be repeated 4 times—once for each buffer to be transmitted—resulting in the queuing of at least 4 TX data descriptor entries by host processor 3 in TX data descriptor entries portion 19 of host memory 5.

In block 405, and referring again to FIG. 4, after host processor 3 queues the required number of TX data descriptor entries in host memory 5, host processor 3 will write the address of the last entry into storage location 105, which is contained in SBus protocol engine 303, via the slave portion of SBus interface 301. Thus, if the data that comprises the packet is contained in more than one storage buffer, host processor 3 will write the number corresponding the address of the last entry of the set of new TX descriptor entries queued in TX data descriptor entries portion 19 of host memory 5 to storage location 305.

In block 407, where there is only one packet to be transmitted and the packet is completely contained in storage buffer 33, after host processor 3 writes a value into storage location 305, ATM segmentation and TX logic 313 will request the information contained in TX data descriptor entry 21 through the use of SBus protocol engine 303. SBus protocol engine 303 will perform a direct memory access (DMA) read of TX descriptor entry 21 in host memory 5 on behalf of ATM segmentation and TX logic 313 and pass the descriptor fields, rd_target 23, rd_buffer_chain 25, rd_buffer_pointer 27 and rd_buffer_length 29, contained in TX data descriptor entry 21, back to ATM segmentation and TX logic 313 through synchronization and buffering logic 309. Specifically, again referring to FIG. 4, ATM segmentation and TX logic 313 will receive the values contained in rd_target field 23, rd_buffer_pointer field 27, and rd_buffer_length field 29 from synchronization and buffering logic 309.

In block 409, after ATM segmentation and TX 313 receives the descriptors contained in TX packet descriptor entry 21, ATM segmentation and TX 313 will request the contents of the packet. ATM segmentation and TX 313 may request anywhere from 1 to 64 bytes per DMA. For every request, ATM segmentation and TX 313 must assert rd_req 341 and generate a set of signals over rd_size 337 and rd_addr 343 to burst dispatcher 311. ATM segmentation and TX logic 313 will also output, through signal lines rd_target 339, the value of descriptor field rd_target 23, which was received as described in block 407.

The set of signals comprising rd_size 337 describes the size of the data read to be performed, which is limited by the size of the maximum burst and system cache line. Rd_size 337 can be from 1 to 64 bytes and is represented by a 7-bit binary value. Rd_addr 343 is a 32-bit address of the packet in the address space of the device that contains the packet.

In block 411, burst dispatcher 311 will combine the values contained on signal lines rd_size 337, rd_addr 343, and rd_target 339, which were received from ATM segmentation and TX logic 313, with the values contained in bus target characteristics register 307, which are provided by SBus protocol engine 303 through the use of signal lines bus_data_width 327 and bus_max_burst_size 329, to generate a read control word to control the bus characteristics of the next SBus read cycle. Burst dispatcher 311 will update the control word to SBus protocol engine 303 through the use of bus_cycle_control_word 331 signal line after SBus protocol engine 303 provides the desired SBus cycle state information through the use of SBus_state_info 333. Thus, control words are updated after rd_req 341 is asserted and before the new SBus cycle begins—ensuring smooth switching of bus characteristics for back to back DMA reads of bus targets with different bus characteristics.

In block 413, SBus protocol engine 303 will performs SBus master DMA reads to read a portion of the buffer from the slave device determined by rd_target 339, with all protocol characteristics and behavior in accordance with bus_cycle_control_word 331.

In block 415, after each SBus cycle, SBus protocol engine 303 transfers the data read from SBus 13 to synchronization and buffering logic 309 through the use of SBus data/control 319 lines.

In block 417, synchronization and buffering logic 309 will transfer the data to ATM segmentation and TX logic 313 through the use of ATM data/control 323 lines. ATM segmentation and TX logic 313 will be responsible for segmenting the data into the ATM cell and transmitting them over ATM network media 17 through the use of ATM network media interface 317.

Referring to block 419, if all the descriptor entries have been processed, then network adapter 15 would wait for host processor 3 to place the address of the last descriptor entry in a new set of descriptor entries to storage location 305. Otherwise, if there are more descriptor entries to be processed, then blocks 409 through 419 would be repeated for each descriptor entry and the associated storage buffer to be processed and transmitted, respectively. Thus, if host processor 3 had created 3 TX descriptor entries in block 401, then blocks 409 through 419 would be repeated 3 times— once for each TX descriptor entry to be processed— resulting in the transmission of 3 storage buffers.

In summary, the current invention provides a method and apparatus for allowing a packet which is divided and stored in the different bus targets of a computer system to be reassembled and transmitted to a computer network without impacting I/O bus cycles or bandwidth in reading from the different bus targets. Additionally, the present invention is able to perform the above functions when the bus targets of the computer system have different bus characteristics—i.e. the present invention allows smooth transitions of bus characteristics from one back to back DMA read transaction to another.

While the present invention has been particularly described with reference to the various figures, it should be understood that the figures are for illustration only and should not be taken as limiting the scope of the invention. Many changes and modifications may be made to the invention, by one having ordinary skill in the art, without departing from the spirit and scope of the invention.

What is claimed is:

1. A method for transferring packet data between a first bus target and a network adapter in a computer system having an I/O bus, wherein said first bus target is coupled to said I/O bus, a second bus target is coupled to said I/O bus, and said network adapter is coupled to said I/O bus and a network media, comprising the steps of:

creating a set of descriptor entries, wherein one descriptor entry is generated for each portion of each packet to be transmitted between one of said first bus target and said second bus target, and said network adapter; and transferring a portion of packet data from one of said first bus target and second bus target to said network adapter wherein the bus target on which said portion of packet data is contained is described by one of said set of descriptor entries.

2. A computer system comprising:
a host processor coupled to a I/O bridge;
a system bus connected to said I/O bridge;
a memory interconnect logic coupled to said host processor and to said I/O bridge;
a host memory coupled to said memory interconnect logic;
a bus target connected to said system bus; and
a network adapter having
a first interface coupled to said system bus and,
a second interface coupled to a network media,
wherein said network adapter can acquire and assemble a first set of data to be transferred over a computer network from said host memory and said bus target.

3. A computer system according to claim 2, wherein said system bus is a SBus.

4. A computer system according to claim 2, wherein said network media is an ATM network media.

5. A method for transferring packet data between a bus target and a network adapter in a computer system having an I/O bus, wherein the bus target is coupled to the I/O bus, the network adapter is coupled to the I/O bus, and a packet comprises one or more portions, comprising:

creating a set of descriptor entries, wherein one descriptor entry is generated for each portion of the packet, and each portion is to be transmitted between the first bus target and the network adapter; and transferring each portion of the packet from said bus target to the network adapter wherein a location on said bus target on which the portion of packet data is contained is described by one of the set of descriptor entries.

6. A method of transferring data between one or more bus targets in a computer system and a network adapter in the computer system, comprising:

creating one or more descriptions, wherein each of the descriptions is generated for each portion of each packet to be transmitted from one or more bus targets and each description describes a location of data on a bus target to be transmitted from the computer system;

sending one or more requests for data from the network adapter to one or more bus targets corresponding to the descriptions; and transferring data directly from corresponding one or more bus targets to the network adapter.

7. The method of claim 6, wherein each description is a descriptor entry.

8. The method of claim 6, further comprising:
forming a packet for transmission from transferred data; and
transmitting the packet.

9. A computer system comprising:
a host processor;
an I/O bus coupled to the host processor;
a bus target coupled to the I/O bus, wherein the bus target includes at least a portion of data to be transmitted from the computer system; and
a network adapter coupled to the I/O bus, including circuitry that, based on a description of a location on the bus target of the portion of data, retrieves from the location on the bus target the portion of data, the description is generated for each portion of each packet to be transmitted from one or more bus targets.

10. The computer system of claim 9, wherein the circuitry of the network adapter formats retrieved data into a packet suitable for transmission from the computer system, and transmits the packet.

11. The computer system of claim 9, wherein the host processor creates the description of a location on the device of the portion of data.

12. The computer system of claim 9, wherein the device is a bus target.

13. The computer system of claim 9, wherein the description is a descriptor entry.

14. A computer system comprising:

a host processor;

an I/O bus coupled to the host processor;

a bus target coupled to the I/O bus, wherein the bus target includes at least a portion of data to be transmitted from the computer system;

a network adapter coupled to the I/O bus, including circuitry that, based on a description of a location on the bus target of the portion of data, retrieves from the location on the bus target the portion of data;

a second device coupled to the I/O bus, wherein the second device includes a second portion of data to be transmitted from the computer system, and wherein the network adapter circuitry retrieves the second portion of data from a location on the second device based on a description of the location on the second device.

* * * * *